(12) United States Patent
Gruber

(10) Patent No.: US 7,266,840 B2
(45) Date of Patent: Sep. 4, 2007

(54) METHOD AND SYSTEM FOR SECURE, AUTHORIZED E-MAIL BASED TRANSACTIONS

(75) Inventor: Thomas Robert Gruber, Redwood City, CA (US)

(73) Assignee: Vignette Corporation, Austin, TX (US)

(*) Notice: Subject to any disclaimer, the term of this patent is extended or adjusted under 35 U.S.C. 154(b) by 855 days.

(21) Appl. No.: 09/905,401

(22) Filed: Jul. 12, 2001

(65) Prior Publication Data

US 2003/0014633 A1    Jan. 16, 2003

(51) Int. Cl.
*H04L 9/32* (2006.01)
(52) U.S. Cl. ........................................................ 726/9
(58) Field of Classification Search ................. 713/201
See application file for complete search history.

(56) References Cited

U.S. PATENT DOCUMENTS

| | | | | |
|---|---|---|---|---|
| 4,393,269 A | * | 7/1983 | Konheim et al. | 705/75 |
| 4,630,201 A | * | 12/1986 | White | 705/44 |
| 6,247,127 B1 | * | 6/2001 | Vandergeest | 713/100 |
| 6,282,522 B1 | * | 8/2001 | Davis et al. | 705/41 |
| 6,968,364 B1 | * | 11/2005 | Wong et al. | 709/217 |
| 2002/0010638 A1 | * | 1/2002 | Fischer | 705/26 |
| 2002/0068629 A1 | * | 6/2002 | Allen et al. | 463/42 |

OTHER PUBLICATIONS

Kerberos: An Authentication Service for Computer Networks, http://www.isi.edu/gost/publications/kerberos-neuman-tso.html, accessed on Oct. 17, 2006, published Sep. 1994.*

* cited by examiner

*Primary Examiner*—Nasser Moazzami
*Assistant Examiner*—Brandon S Hoffman
(74) *Attorney, Agent, or Firm*—Sprinkle IP Law Group

(57) ABSTRACT

Method and system for secure off-line transactions using a security access token for authentication and authorization of transactions. The user requests and receives the token from an application server of a desired service while on-line, logs off, prepares a transaction for entry into the system, and sends a message to the application server. The message contains a transaction object, such as a transaction, a query, an entry, an update, a revision, or the like combined with transaction data and the token previously supplied by the server. The server validates the token and executes the transaction object if the user is authorized for the transaction.

31 Claims, 1 Drawing Sheet

METHOD AND SYSTEM FOR SECURE, AUTHORIZED E-MAIL BASED TRANSACTIONS

BACKGROUND OF THE INVENTION

This invention relates to systems and methods for secure e-mail based transactions over public networks, and more particularly to methods and systems for affording secure authenticated transactions over public networks without the necessity for a security infrastructure requiring online access during the transaction.

Many on-line services such as banking, brokerage, marketing, sales or the like, require a high degree of security and protection. This may require authentication, allowing a transmitting site to prove its identity, authorization, allowing a particular type of transaction on a particular set of data, and non-repudiation to guarantee that transactions have not been tampered with. One method of accomplishing this is through a public key infrastructure or PKI, which provides identity authentication, and non-repudiation protection. A public key infrastructure such as public key cryptography enables users of an unsecure public network, such as the Internet, to exchange data securely and privately through the use of cryptographic keys that are obtained and shared through a trusted authority. The public key infrastructure also provides for a digital certificate that can identify an individual or an organization, and a directory service that can store and revoke the certificates. However, PKI requires special software, a certain level of administrative overhead, and training. Moreover, PKI requires keys which are published and managed by a central authority for all users of this system which entails a further degree of complexity.

Another method of achieving authentication, authorization, and nonrepudiation is to use a on-line connection over a secure network connection, either within a firewall or through a privacy tunnel such as Secure Sockets Layer or Virtual Private Networking, combined with an authentication scheme such as user ID and passwords or kerberos keys issued by logging into a certification service. For example, in a traditional web-based financial transaction, the user connects to the server through a secure private channel and authenticates at log-in time by entering a password or otherwise presenting credentials established as a consequence of the user being on a network. However, this method of securing transaction requires that the user be on-line at the point in time when the transaction is authorized.

Some approaches to authentication, authorization, and nonrepudiation combine both PKI and secure, on-line access. For example, the authentication credentials for logging into an on-line service may be issued by a PKI infrastructure.

While PKI can be a solution for authentication, authorization, and nonrepudiation of transactions over unsecure public networks, and on-line connections with conventional authentication can be a solution over secure private networks, a need exists for a similar level of protection for off-line transactions without PKI. An off-line transaction is one in which a user performs the transaction while disconnected from the network, and later through a process of synchronization or routing sends the transaction to a server. An example of an off-line transaction is filling out an electronic form and mailing it in to a server. When the form is received by the server, the transaction is completed. Off-line transactions offer the advantage of being independent of network connectivity. They offer the farther advantage of being able to use any asynchronous data routing or replication process. Off-line transactions are also advantageous in that they allow a user to prepare a transaction leisurely without the necessity of being connected to the server. However, once a transaction has been prepared, to complete it the user requires the same kind of security as would otherwise be provided by a PKI or similar security system in order to protect the security of the transaction when sent over a public network. For example, if the transaction were sent using email over a public network, the contents of the message would be encrypted using a public key issued to the user, so that others could not send a similar message in the user's name. Presently, it is necessary for a user to be either connected to a server over a secure network when performing a transaction or to use a PKI approach in order to have the degree of security required by many applications.

Thus, a need exists for a method and system enabling off-line transactions with substantially the same security as PKI, without the requirement of secure network connectivity, and without the need for special PKI software to be run by the end user. It is to these ends that the present invention is directed.

SUMMARY OF THE INVENTION

The invention affords a method and system which solves the foregoing and other problems associated with performing off-line secure transactions.

Many of the advantages of PKI are obtained with off-line transactions, including those over asynchronous messaging systems, using the invention.

In one aspect, the invention provides methods and systems performing transactions while off-line, that is while not connected to an application server such as a server running a database application. Initially, when the user is on-line, authenticated, and connected to the server over a secure network, a security access token is issued to the user. The token authorizes the specific user to perform a specific transaction type on specific sets of data. The token contains a unique identifier that can only be generated by the server while the user is connected, and which is unique to the specific user, transaction type, and authorized transaction data. After receiving the security access token, the end user logs off. While off-line, that is, while not logged into the application server, the user prepares a transaction for entry into the application server. Thereafter, the end user transmits the transaction object and the token to the application server as an e-mail message, without the necessity of logging back onto the application server. It is a feature of the invention that the message may be delivered over an asynchronous delivery medium to the server, for example, using store-and-forward or data synchronization to deliver the message. It is also a feature of the invention that the message may be sent over unsecure public networks, since the transaction token guarantees that the user was given authorization for the transaction while previously connected to the server over a secure network.

This message contains a transaction object (that is a query, an entry, an update, a revision, or the like with the data required to fulfill the transaction), and the security access token previously supplied by the server. The token includes data sufficient to determine the user identity, the transaction type, and the data objects to which access is authorized. The message is sent to the application server. Upon receipt of the message, the server examines the security access token, checks the token for validity, and accepts or rejects the token. If the transaction is allowed, the server executes the transaction object (query, entry, update, revision, or the like with associated data).

In a more specific aspect, the token contains additional security information. In one aspect, the token includes an access start time, an access end time, and an enumeration of authorized data objects and specific transactions on specific data objects or specific sets of data objects. Additionally, in accordance with other aspects, the token contains authenticating data. For example, the token may specify an e-mail audit signature, such that the token is valid only if the message containing the off-line transaction is delivered along a path that matches the e-mail audit signature.

More specifically, to afford greater security, the transaction object may be encrypted, using the transaction token or a part of the transaction token as a temporary key. This assures nonrepudiation of the transaction.

The e-mail message received over the asynchronous delivery medium includes the security access token and the transaction object. These are embodied in the e-mail message. Alternatively, one or both of the security access token and the transaction object are attachments to the e-mail message.

In more specific aspects, the method and system of the invention contemplate the end user asynchronously exchanging data with the application server. In the case of a database application, the end user's access may accomplish a transaction beyond a simple database entry. For example, the end user may include performing a transaction such as a purchase, a sale, a find transfer, downloading a text file, downloading a graphics file, or editing a document. In the case of editing a document, the document may be considered a data file, and the end user may check out the document, edit the document off-line, and check in the edited document as an e-mail attachment.

DESCRIPTION OF THE PREFERRED EMBODIMENT

Figure 1:
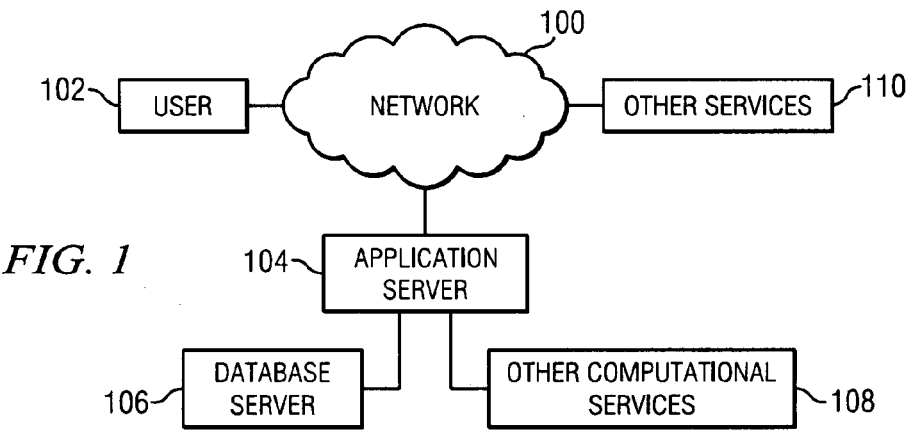
FIG. 1 is an overview of a Web-based system with which the method and system of the invention may be employed.

The invention relates to methods and systems for performing secure transactions while off-line, that is while not connected to an application server, such as a server for a database application, that is required to complete the transaction, and will be described in that context. However, it will be appreciated that this is illustrative of only one utility of the invention.

As will be described more fully below, a user that wishes to prepare a secure transaction off-line may obtain from an application server, such as a server for a database application, a security access token that authorizes the user to perform the transaction while off-line. The user may then log off, and prepare the transaction off-line. Subsequently, the user may go back on line and forward the transaction to the application server, as, for example, using an e-mail message.

This message contains a transaction object, (that is a transaction, a query, an entry, an update, a revision, or the like, together with the data used in the transaction), and contains the security access token previously supplied by the application server. The message is delivered to the server.

Upon receipt of the message, the server validates the security access token against the transaction object, other data in the message, and the current state of the on-line database. If the transaction is valid, the server executes the transaction object. As a consequence of executing the transaction object, the server may, for example, mail a response to the user describing the results of the transaction.

This invention allows the transaction to be prepared off-line, and it is completed when the email message is received by the server, without requiring the user to log back onto the server to reauthenticate. In addition, there is no need for the user to attach a public key to the message because the transaction token is generated by the server and carries, to the off-line environment, the authentication information obtained while logged onto the server.

The application server may comprise a database server for managing access to a database. The application server may implement a web-based application, a client-server application, or any similar network-based application. As used herein a "database" is a collection of "data" relevant to a business, enterprise, task, mission, goal, or activity, where the "data" is retrievable, and can be queried, updated, edited, and searched. The data can be transactional data, financial data, inventory data, graphical data, or text data, as in a collection of word processing files or email messages that can be edited, searched, retrieved, or supplemented. As also used herein, a "data object" is identifiable data in a database. A "security access token " is a file, a certificate, a character string, or the like that encodes an authorization for a specified type of transaction by the specific user over a specified set of data objects on a system and to execute certain enumerated functions of the system. A "transaction object" is a command, instruction, query, or the like to execute an authorized function, together with the data required to execute the function.

The security access token is a data object that is used for authorizing access to and transactions on the application. In a preferred form, the token contains a unique identifier that is generated by the application server, along with data identifying the user, the transaction type, and the identity of data objects over which the transaction is authorized. The end user requests a token for a secure transaction off-line from an application server while logged on to the server. The application server issues the token to the end user. The application server may issue the token immediately over the on-line connection, or it may deliver the token over an asynchronous mechanism such as email or data replication. Preferably, the token contains a one-way encryption of the user identity, transaction type, and identity of authorized data, using the unique identifier as a key. This ensures that only the issuer or holder of the key could construct the token or examine its encrypted contents. The encrypted information in the token can be used by the server to guarantee nonrepudiation of the transaction.

The end user initiates the transaction while off-line, that is, while not logged into the application server. The user may fill out a form, attach documents, forward a message, or otherwise specify data to the transaction while off-line. Subsequently, the user transmits the transaction object and the token to the application server as a message or through data synchronization. The application server receives the incoming message, checks the token for validity, and accepts or rejects the token. In the preferred embodiment, the server associates the transaction token with the identity of the data object that is the primary argument to the transaction or with the user. When the application server receives the incoming message, the primary argument or the user is checked for associated transaction tokens. If a matching transaction token is found, the token is considered valid.

Next, the application server checks the transaction object and message for conformity with the token, and accepts or rejects the transaction. Conformity requires, for example, that the user identity, transaction type, and data of the transaction match those specified in the transaction token. For added security, it may similarly require that the email audit signature match the requirements specified in the transaction token.

FIG. 1 illustrates a network system with which the invention may be used. The network may be a public network or the private network of an enterprise, and the network may be secure (as in Virtual Private Networking over a pubic network or using SSL) or unsecure. The figure illustrates a public network 100, such as the Internet, to which a user 102 of a plurality of other users (not shown) may connect in order to gain access to application servers, such as application server 104, in order to perform transactions. Application server 104 may, for example, access a database 106, or it may provide access to other computational services (represented generally as 108 in the figure) such as shared storage systems, distributed computation arrays, and security services such as single sign-on authentication services, directory services, and public key services. In some configurations, the application server and the computational services reside on the same machine; for example, the application server may access a file storage system or database that is connected to the same computer. The application server may implement web-based services such as collaboration systems, knowledge management systems, consumer purchasing systems, e-commerce exchanges, stock trading or other financial on-line services, or any other network-resident information processing service.

While online, the user logs on to the particular on-line application server 104, and provides whatever level of authentication is required for the desired application. The authentication method is independent of the access or transaction type, and can be as strong as necessary to provide a desired level of authentication and security. For example, the authentication method may require that a temporary key be issued by a network security system to give the user temporary credentials for accessing the server. The authentication method may also be a single sign-on method that allows the user access to the application by virtue of the user having access to the secure network inside of a firewall. The application server checks to authenticate the user and to verify that the user has the access the application.

Figure 2:
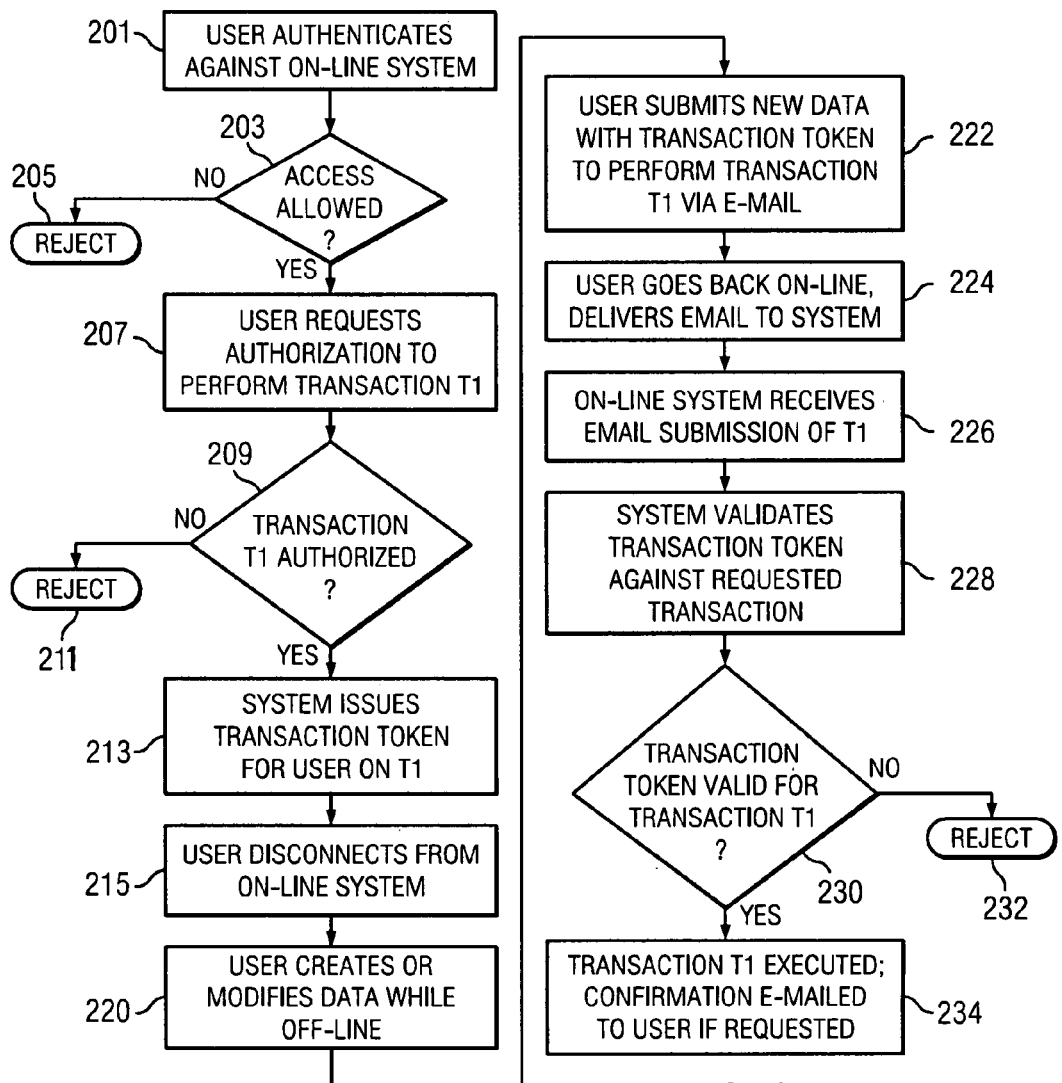
FIG. 2 is a flow chart illustrating a method according to a preferred embodiment of the invention.

FIG. 2 is a flowchart describing a method in accordance with the invention. As shown, in step 201, a user, such as user 102 of FIG. 1, authenticates itself against the online system. As noted above, the authentication method may be chosen based upon the desired degree of security for the online system. In step 203, the system determines whether access by the user is properly authenticated, as by checking whether the user has the right to access the application using the given credentials. The criteria upon which access is granted may also be selected in accordance with a desired set of criteria. If the system determines that the user is not properly authenticated, access is rejected in step 205. If the user is authenticated, the method proceeds to step 207, where the user requests authorization to perform a transaction, T1. Authorization is the process of determining whether a user has the right to perform a given transaction, such as modifying a data object in the database. This may be accomplished using any of a number of different access control schemes, which are well known to those skilled in the art. In the case of access control for a database application, the database may contain a mapping from different sets of users to sets of transactions on sets of data objects. For any given user, transaction type and data arguments of the transaction, the mapping will indicate whether or not the transaction is permitted. The authorization step is initiated by the user requesting a token to perform the transaction off-line, in step 207. The system then checks at step 209 to determine whether the transaction T1 is authorized for the user. If not, the request is rejected at 211. If the transaction is authorized, in step 213 the system issues a transaction token for the user for transaction T1. The transaction may, for example, be the right to replace a specific file at a particular location. The token which is issued to the user is preferably generated from the data in such a way that only after the user has passed the authentication of step 203 and the authorization of step 209 is the software capable of generating the token. That is, the user must have proven its identity using the on-line authentication system, and established the right to perform the transaction, and the token will encode the fact that this secure authentication and authorization has been accomplished. Any encoding scheme may be used for this purpose as long as it produces an identifying bit pattern that cannot be generated without the authentication and authorization steps. In a preferential implementation, the system generates a unique identifier that is kept on the server, and incorporates this identifier into the security access token. For example, the token could be encrypted using this unique identifier. This ensures that the right to perform the transaction which is granted by step 213 could only be issued by the server itself, and that a fraudulent token could not be synthesized from other information such as the user name and password alone. In step 215, the user disconnects from the online system.

While off-line, the user may, in step 220, prepare the transaction such as creating or modifying data to the transaction object. For example, the user may fill out a form, enter a query, attach files to message, run a program that creates a data file, or in any like manner supply the input data to the authorized transaction. In step 222, the user goes back on-line, and submits the new data with the transaction token necessary to perform the transaction to an e-mail server. The token may be attached to a form for mailing in the transaction, or it may be embedded in the form or message body. The form may be of many different types. It may include raw text, a HTML form, a XML form, or other desired form. It is immaterial which format is used for mailing the transmission data. It is only required that the transaction token be included in or with the e-mail message in order to perform the transaction.

At step 224, the user goes back on line and delivers the e-mail message to the system. In step 224 the user does not log onto the on-line system. The e-mail message can be delivered by any means that email is delivered. At step 226, the online system receives the e-mail corresponding the transaction T1. In step 228, the system validates the transaction token against the requested transaction, and compares the security access token against criteria in step 230. The check for validity in step 230 may, for example, compare the user, transaction type, and data objects accessed against the information encoded in the security access token. If the transaction is not valid, it is rejected at step 232. Otherwise, the transaction Ti is executed in step 234 and an appropriate confirmation may be e-mailed to the user.

The token may include data that limit the period of time during which the token is valid. For example, the token could have a time limit so that it expires after one day.

Additionally, the e-mail account or other identifying e-mail audit signature of the user may be incorporated into the token, so that the token is determined to be valid only if the transaction is sent from a mail program using a mail delivery path that matches the audit signature. Additionally, the verification method may be combined with a privacy mechanism, such as SMIME, to encrypt the data of the mailed-in transaction. Such a privacy mechanism is convenient because it does not require a global PKI. This is either because the online service to which the transaction is to be mailed may have a public key, even if the user does not have a public key. For example, if the server were a website at a particular host, the website could provide a link to an object which, when downloaded, would indicate to the user's e-mail program how to encrypt the e-mail in order to send it. Then, when the mail is received, only the website whose key was used initially will be able to decrypt the incoming message. This is how a normal public key system works. What is different about the present mechanism, however, is that there is no need for a Public Key Infrastructure in which keys are published and managed for all users of the system.

As an alternative, the receiving system may also issue temporary public keys, as for private encryption as described above, that are a one-way function of a universal public key and the e-mail address to which the mail is to be sent. This adds further protection against breaking the security of the system because each stream of incoming messages would all use different public keys for encrypting data (for privacy as well as access permission). Thus, there would be no instance of a direct encoding of the universal public key at the server in any messages.

The mechanism as described above is particularly adaptable to web-based services such as previously described. It is also applicable to devices that are normally offline, but which occasionally synchronize with the network. For example, a user could check out a token to execute a specific stock trade or consumer purchase, and download the transaction token to a portable device such as a hand-held device. Subsequently, when the user decides to execute the transaction, the user issues the transaction on the hand-held device. When the device is synchronized, the e-mail will be sent to the server and the transaction will be executed, or denied if the security access token is improper.

Although the invention is well suited for use with e-mail, it also applies to any asynchronous data exchange. For example, a file could be checked out by a user using a security access token, and then edited by the user offline. When the file has been saved, it may be saved to an offline storage, such as the hard disk on a laptop. Subsequently, when the operating system or other synchronization mechanism replicates that file to the master server, the master server may examine the transaction token to authorize or deny any changes to the file at replication time.

A similar method can be used on portable computing devices, such as hand-held devices, that synchronize data files or data records, instead of using email to deliver transactions that are prepared off-line. The security access token can be delivered to the portable device through the synchronization of a web-browser interface to the device. When the user interacts with the off-line instance of the web-browser interface, he or she fills out a form which contains the security access token and the transaction data. When the portable device is synchronized, the web-browser form is executed on the main application server, which completes the transaction as well.

From the foregoing, it will be appreciated that the invention affords a similar degree of authentication protection as conventional on-line services, such as those used for on-line banking, to offline, e-mail based transactions. These offline e-mail-based transactions may be initiated either by individuals or by programs. They are advantageous over on-line transaction in that they do not depend upon network connectivity, and can be used with any asynchronous data routing or replication process. They are advantageous in permitting a user to perform a secure transaction offline and subsequently execute the transaction by going on-line and forwarding it via e-mail. Prior to the invention, a similar degree of security could be obtained only by using PKI with its attendant complexity, training and overhead. In contrast, the invention affords the identity authentication and non-repudiation benefits of a PKI system without the special software, administrative overhead or training costs associated with a full PKI system. Furthermore, no personal identity keys need be issued for this system.

Furthermore, the invention provides a higher level of security than PKI alone, because PKI only established the authentication of the user but not the authorization to perform a specific transaction. For example, the invention may allow the authorization to trade a stock during a particular window of time, whereas PKI could only authenticate the user and check for the authorization to perform the transaction when it is received by the system.

More specific examples of authorization to data which the security access token may provide include:

Read authorization, which allows reading, but not modification of data. For example, the token could authorize the user to request the status of a data object by mailing in a request; the system could mail back the results.

Insert authorization, which allows insertion of new data, but not modification of existing data. For example, the token could authorize the addition of a file to a location or into a workflow step in an on-line system.

Update authorization, which allows modification, but not deletion, of data. For example, the token could allow one to approve a purchase or a proposal document by updating its approval status.

Delete authorization, which allows deletion of data. For example, the token could authorize the destruction of a sensitive legal document used in a negotiation.

Authorization may include only limited views of data or relations within data. Additionally, the authorizations may be file or field specific. For example, "Read" authorization may extend to a large set of data files and/or of fields within the files, while "Insert" and/or "Update" authorization may be granted to a much more limited set of data files as well as to a much more limited set of fields, and "Delete" authorization may be even more limited, for example, to files created by the current end-user.

A "Read Transaction" may also include operations that do not change a database but do perform computation or otherwise consume resources. For example, a security access token could be used to authorize the performance of a search or the printing of a document.

The end user may also be granted authorization to access an application server as for a database schema, to include for example:

Index authorization, to create and delete indices,

Resource authorization, to create new relations in a relational database,

Alteration authorization, to add or delete attributes in a relation, and

Drop authorization, which allows deletion of relations.

While the invention has been described with respect to certain preferred embodiments, it will be appreciated that changes may be made without departing from the principles of the invention, the scope of which is defined by the appended claims.

I claim:

1. A method of conducting a secure transaction with an on-line service while offline comprising the steps of:
    issuing a transaction authorization token to a user from an application server for the on-line service while the user is online with the on-line service;
    preparing an off-line transaction object containing data to specify and request the secure transaction;
    sending a message to the on-line service, said message containing the off-line transaction object and the transaction authorization token;
    upon receipt of said message, the application server validating the transaction authorization token to authenticate the user and to authorize the secure transaction, wherein the application server performs said validating while the user is offline from the on-line service; and
    executing the off-line transaction object if the secure transaction is authorized.

2. The method of claim 1, wherein the transaction authorization token is issued to the user via an e-mail message sent from the application server for the on-line service.

3. The method of claim 2, wherein the application server receives an incoming message including the transaction authorization token, checks the transaction authorization token for validity, and accepts or rejects the transaction authorization token.

4. The method of claim 3, wherein said sending a message to the on-line service containing the transaction authorization token and off-line transaction object comprises sending an e-mail message delivered, to the application server via an asynchronous e-mail delivery method.

5. The method of claim 4 where the asynchronous delivery mechanism is database record synchronization.

6. The method of claim 5 where the asynchronous e-mail delivery method comprises a synchronization of data between a portable computing device and an on-line service.

7. The method of claim 5, wherein the application server authorizes a specific transaction by a specific user on specific data objects such that the transaction authorization token can be used only once.

8. The method of claim 1, wherein the transaction authorization token is issued to the user via a download operation while the user is on-line with the on-line service.

9. The method of claim 1, wherein the user prepares the off-line transaction object while the user is off-line from the on-line service.

10. The method of claim 1, further comprising requesting a transaction authorization token, wherein the user requests the transaction authorization token for the secure transaction from the application server for the Qn-tine service.

11. The method of claim 10, wherein the on-line service comprises the application server, and wherein the application server accesses a database.

12. The method of claim 1, wherein said issuing a transaction authorization token comprises generating a unique identifier when the token is issued, wherein said generating is performed by the on-line service.

13. The method of claim 1, wherein the transaction authorization token is a one-way encryption of at least one of an identity of the user, a transaction type, and a data object for which the transaction is authorized.

14. The method of claim 1, wherein the transaction authorization token includes data representing a time period during which the transaction authorization token is valid.

15. The method of claim 1, wherein the transaction authorization token includes data representing a valid access duration for the transaction authorization token.

16. The method of claim 1, wherein the transaction authorization token specifies an e-mail audit signature, and said transaction authorization token is valid only if the transaction is sent from an e-mail program via an e-mail delivery path that matches the e-mail audit signature.

17. The method of claim 16, wherein an e-mail address to which the message is sent varies according to an authorized data object and transaction type.

18. The method of claim 1, further comprising encrypting the off-line transaction object.

19. The method of claim 18, wherein said encrypting comprises issuing a temporary public key that is a one-way encryption function of an address to which the secure transaction is to be sent for encryption of the off-line transaction object.

20. The method of claim 1, wherein the transaction authorization token is contained in a body or a header of an e-mail message.

21. The method of claim 1, wherein the transaction authorization token and the off-line transaction object are attachments to an e-mail message.

22. The method of claim 1, wherein the application server is a web-based application server.

23. The method of claim 1, wherein said secure transaction is selected from the group consisting of a database modification, update, adding a file, and editing a file.

24. The method of claim 1, wherein said secure transaction is selected from the group consisting of a database modification, update, adding a file, editing a file, checking out a file, editing the file off-line, and checking in the file as an e-mail attachment.

25. The method of claim 1, further comprising authenticating a user such that the user is online with the on-line service, wherein said authenticating is performed with a password and a network identity while the user is logging-on to the on-line service.

26. The method of claim 1, wherein the user comprises a software agent adapted to conduct the transaction on behalf of the user.

27. The method of claim 1, wherein the user sends the message to the on-line service while the user is offline from the online service.

28. The method of claim 27, wherein the message to the on-line service is sent via email.

29. The method of claim 1, wherein the transaction object includes an instruction to execute a function at the application server.

30. The method of claim 29, wherein the authorization token is a separate object from the off-line transaction object.

31. A method of conducting a secure transaction with an on-line service while offline comprising the steps of:
    issuing a transaction authorization token to a user from an application server for the on-line service while the user is online with the on-line service;
    preparing an off-line transaction object containing data to specify and request the secure transaction;
    sending a message to the on-line service, said message containing the off-line transaction object and the transaction authorization token;

receiving said message, and upon receipt of said message, the application server for the on-line service validating the transaction authorization token to authenticate the user and to authorize the secure transaction; and executing the off-line transaction object upon validation of the transaction authorization token, wherein the user is not required to be online with the on-line service for any one or more of the group comprising: said preparing, said sending, said receiving, or said executing.

* * * * *